(12) United States Patent
Naberhuis et al.

(10) Patent No.: US 7,256,951 B2
(45) Date of Patent: Aug. 14, 2007

(54) LIGHT GUIDE DISPLAY WITH PROTECTIVE LAYER

(75) Inventors: Steven L. Naberhuis, Palo Alto, CA (US); Huei Pei Kuo, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 11/082,438

(22) Filed: Mar. 17, 2005

(65) Prior Publication Data

US 2006/0209433 A1   Sep. 21, 2006

(51) Int. Cl.
*G02B 27/02* (2006.01)
(52) U.S. Cl. .................. 359/802; 353/76; 385/115
(58) Field of Classification Search ............... 359/802; 353/76
See application file for complete search history.

(56) References Cited

U.S. PATENT DOCUMENTS

| | | | |
|---|---|---|---|
| 4,907,090 A | 3/1990 | Ananian | |
| 4,929,048 A | 5/1990 | Cuypers | |
| 5,009,475 A * | 4/1991 | Knudson | 385/116 |
| 5,481,385 A * | 1/1996 | Zimmerman et al. | 349/62 |
| 6,418,254 B1 | 7/2002 | Shikata et al. | |
| 6,614,594 B2 | 9/2003 | Murasugi et al. | |
| 6,750,922 B1 | 6/2004 | Benning | |
| 7,006,741 B1 * | 2/2006 | Yu | 385/121 |
| 2005/0276553 A1 * | 12/2005 | Kazakevich | 385/115 |

* cited by examiner

*Primary Examiner*—Jordan Schwartz
*Assistant Examiner*—Jessica T Stultz (57) ABSTRACT

Provided is a light guide display with a protective layer. The light guide display includes a plurality of aligned magnifying layers providing a viewing surface. Each magnifying layer includes a plurality of light guides, each light guide having an input end, a midsection, and an output end. The plurality of input ends are aligned. The plurality of output ends are aligned. A protective layer is coupled to the aligned output ends. An appropriate method of making a light guide screen with a protective layer is also provided.

33 Claims, 6 Drawing Sheets

LIGHT GUIDE DISPLAY WITH PROTECTIVE LAYER

RELATED APPLICATIONS

This application is related to commonly owned U.S. patent application Ser. No. 10/698829, filed on Oct. 31, 2003, by inventors Huei Pei Kuo, Lawrence M. Hubby, Jr. and Steven L. Naberhuis and entitled "Light Guide Apparatus For Use In Rear Projection Display Environments," herein incorporated by reference.

FIELD

This invention relates generally to the field of display devices, and more particularly, to screens and related hardware employed in rear projection display devices.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments.

Despite advancements in projectors and enhanced lens elements, the lens and reflector design remains generally unchanged and tends to be a limiting factor in both picture quality and overall display system thickness.

A developing variation of rear projection displays utilizes light guides, such as optical fibers, to route an image from an input location to an output location and to magnify the image. Such displays may be referred to as light guide screens (LGS's).

The light guides, commonly glass or acrylic, are delicate and may be inadvertently damaged by any number of actions or events occurring in the environment where an LGS is employed. As each light guide is an integral component to the LGS, repair of one or more light guides may be financially impractical.

Weight, thickness, durability, cost, aesthetic appearance and quality are key considerations for rear projection display systems and display screens. From the manufacturing point of view, cost of production and increased yield are also important.

Hence, there is a need for a rear projection display that overcomes one or more of the drawbacks identified above.

SUMMARY

This invention provides a protective layer for the viewing surface of light guide screen displays.

In particular, and by way of example only, according to an embodiment of the present invention, provided is light guide display with a protective layer including: a plurality of aligned magnifying layers providing a viewing surface, each magnifying layer including: a plurality of light guides, each light guide having an input end, a midsection and an output end; the plurality of input ends aligned; the plurality of output ends aligned, and a protective layer coupled to the output ends.

DETAILED DESCRIPTION

Before proceeding with the detailed description, it is to be appreciated that the present teaching is by way of example, not by limitation. The concepts herein are not limited to use or application with a specific light guide screen. Thus, although the instrumentalities described herein are for the convenience of explanation, shown and described with respect to exemplary embodiments, it will be appreciated that the principles herein may be equally applied in other types of light guide screen display systems.

Figure 1:
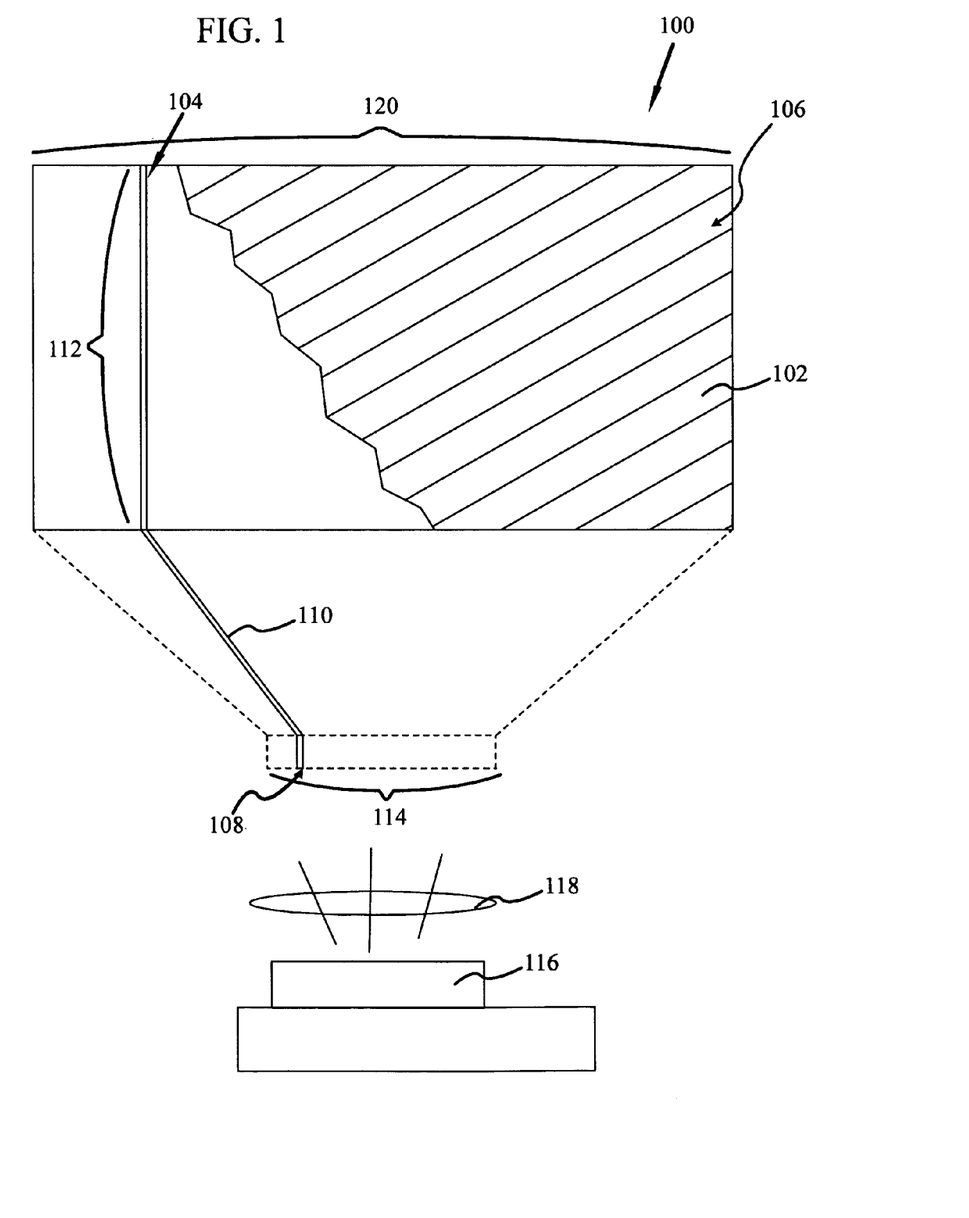
FIG. 1 shows a schematic diagram of a light guide screen with protective layer according to an embodiment.

Referring now to the drawings, and more specifically to FIG. 1, there is shown a portion of a light guide screen (LGS) display 100 with a protective layer 102. In at least one embodiment, LGS display 100 has a plurality of aligned magnifying light guide layers 104 (hereinafter, "magnifying layers 104"), providing a viewing surface 106. Each magnifying layer 104 provides an input location 108, a midsection 110, and an output location 112. Whereas FIG. 1 illustrates a single magnifying layer 104 for ease of discussion and introduction of the elements, FIG. 7 may be referred to as a more complete rendering of the LDS display 100 with a plurality of magnifying layers 104.

As shown, in at least one embodiment, each magnifying layer 104 is a continuous vertical slice across the viewing surface 106 of LGS 100. In an alternative configuration (not shown), each magnifying layer 104 is a continuous horizontal slice across the viewing surface 106 of LGS 100.

In at least one embodiment, collectively, input locations 108 of each magnifying layer 104 provide input surface 114. Collectively, output locations 112 of each magnifying layer 104 provide output face 120. An image is projected upon input surface 114. Such an image may be provided in at least one embodiment by an image source 116, proximate to input surface 114. A lens 118 may optically couple the at least one image source 116 to the input surface 114, or the lens 118 may be an integral part of image source 116.

Image source 116 may be any device capable of providing a visual image, such as, for example, a projector. Image source 116 is not limited simply to this example, and may also include combinations of devices. For example, multiple light/image sources (such as red, green and blue illuminated liquid crystal light valves) may be used as well. As is further expanded below, the image focused upon the input surface 114 is expanded to appear upon the viewing surface 106.

Figure 2:
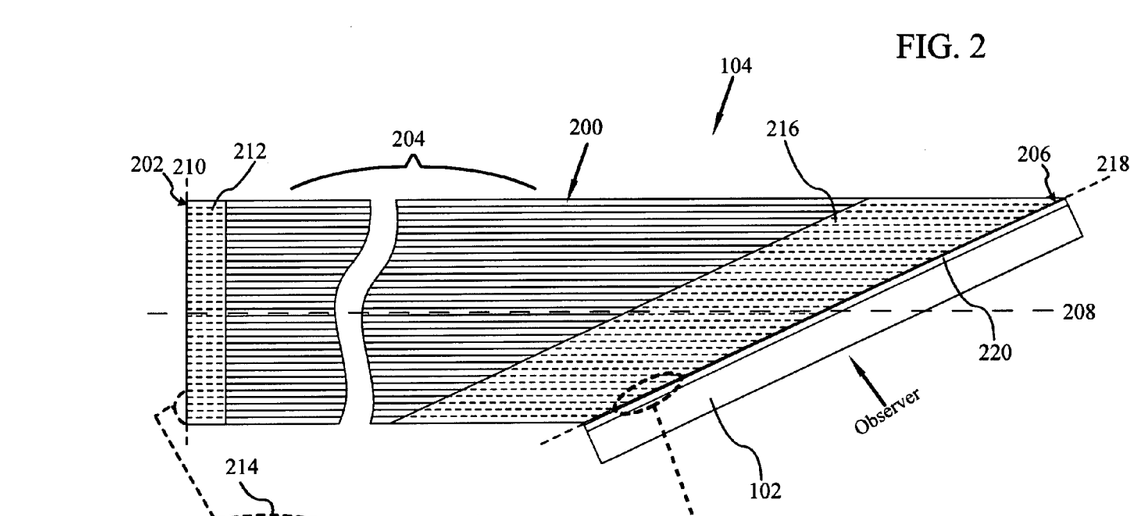
FIG. 2 is a plane view of a magnifying layer with a protective layer incorporated in the display shown in FIG. 1.

As shown in FIG. 2, each magnifying layer 104 has a plurality of light guides 200. Each light guide 200 consists of a core that is substantially optically clear and a circumferential cladding, further discussed below with respect to FIG. 4. The core has an index of refraction, n1, and the clad has an index of refraction n2, wherein n1>n2. In at least one embodiment, each light guide 200 is an optical fiber, more specifically, a cladded optical fiber.

Each light guide 200 has an input end 202, a midsection 204 and an output end 206. The light guides 200 are arranged parallel to longitudinal centerline 208 of magnifying layer 104. Each light guide 200 is configured such that an image presented to the input end 202 is magnified at the output end 206. More specifically, in at least one embodiment the output end 206 is configured to magnify an image presented to the input end 202.

In at least one embodiment, the midsection 204 is a flexible midsection. As such, it is understood and appreciated that magnifying layer 104 may bend and twist such that longitudinal centerline is not always a straight line; however, magnifying layer 104 has been illustrated as substantially flat and straight for ease of discussion.

The plurality of input ends 202 are aligned and, in at least one embodiment, the aligned input ends 202 define a portion of dotted line 210. It is this portion of line 210 that serves as the input location 108 of the magnifying layer 104 shown in FIG. 1. In addition, in at least one embodiment, this portion of line 210 is transverse (in at least one embodiment, perpendicular) to longitudinal centerline 208. When the magnifying layers are stacked, the aligned input ends provide an input surface 114 (see FIG. 1 and FIG. 7). Bonding material 212 (e.g., glue) bonds the aligned input ends 202 as may be more fully appreciated in the enlarged partial end view bounded by dotted line 214.

In at least one embodiment, the plurality of output ends 206 are aligned in substantially contiguous parallel contact, without intervening spacers or material separating each individual output end 206 from its neighbors on either side. In other words, the output ends 206 lie next to one another and are in actual contact, touching along their outer surfaces at one or more points.

As is further illustrated and described below with reference to FIGS. 4 and 6 (illustrating light guide core 400 and clad 402) it is understood and appreciated that the light conveying cores of each optical fiber are not in contact; rather, it is the cladded outer surfaces that are in contact. Moreover, over the course of each entire length, the core of one light guide 200 will not contact the core of another light guide 200.

FIG. 2 illustratively shows thirty-three light guides 200 for ease of discussion and conceptualization. Embodiments may employ more or fewer light guides 200. In at least one embodiment, light guides 200 are always in substantially contiguous parallel contact, particularly at the aligned input ends 202 providing input surface 114 (shown in FIG. 1) and at the aligned output ends 206. However, due to limitations in manufacturing, instances may arise where a small amount of space might exist between one or more light guides 200. However, the majority of light guides 200 are intended to be in substantially contiguous parallel contact. The midsections 204 of light guides 200 may not necessarily be in contiguous contact.

In at least one embodiment, bonding material 216 (e.g., glue) is disposed adjacent to output ends 206 bonding output ends 206 into a uniform line defining a portion of dashed line 218. Bonding material 216 may be substantially the same as bonding material 212.

In contrast to the input ends 202 defining a portion of line 210, the portion of line 218 defined by output ends 206 is usually not perpendicular to longitudinal centerline 208. More specifically, the dotted line 218 as defined by output ends 206 is angled relative to longitudinal centerline 208.

Figure 3:
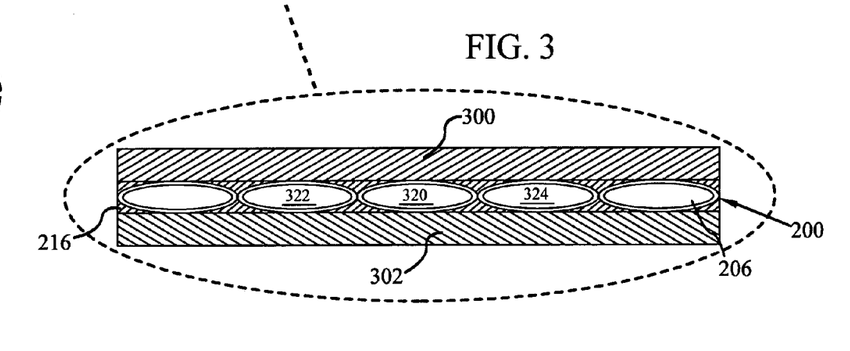
FIG. 3 is a partial cross-sectional view of the output ends of the light guides shown in FIG. 2.

FIG. 3 illustrates a partial enlarged view of five output ends 206 shown in FIG. 2. As illustrated, in at least one embodiment, a top spacer 300 and a bottom spacer 302 are bonded to light guides 200 proximate to the output ends 206. The substantially contiguous parallel contact between the output ends 206 of light guides 200 may also be more fully appreciated. As shown, light guide 320 is in intimate contact with light guide 322, lying to the left, and light guide 324 lying to the right.

FIG. 1 does not illustrate the individual light guide elements of each magnifying layer 104; however, the uniform line of magnifying output ends 206 corresponds to output location 112 shown in FIG. 1. The midsections 204 collectively are represented as midsection 110 and, as shown in FIG. 1, permit separate orientation/positioning of the input surface 114 from the aligned output location 112. Where, as in at least one embodiment, the midsections 204 of light guides 200 are flexible, the midsections 110 of each magnifying layer 104 are also flexible.

Returning to FIG. 2, in at least one embodiment, a louver layer 220 is coupled to the aligned output ends 206. Louver layer 220 is further illustrated and described with respect to FIG. 4. Protective layer 102 is coupled to the louver layer 220, opposite from the output ends 206. In an alternative embodiment where louver layer 220 is not provided, protective layer 102 is coupled directly to the output ends 206.

Figure 4:
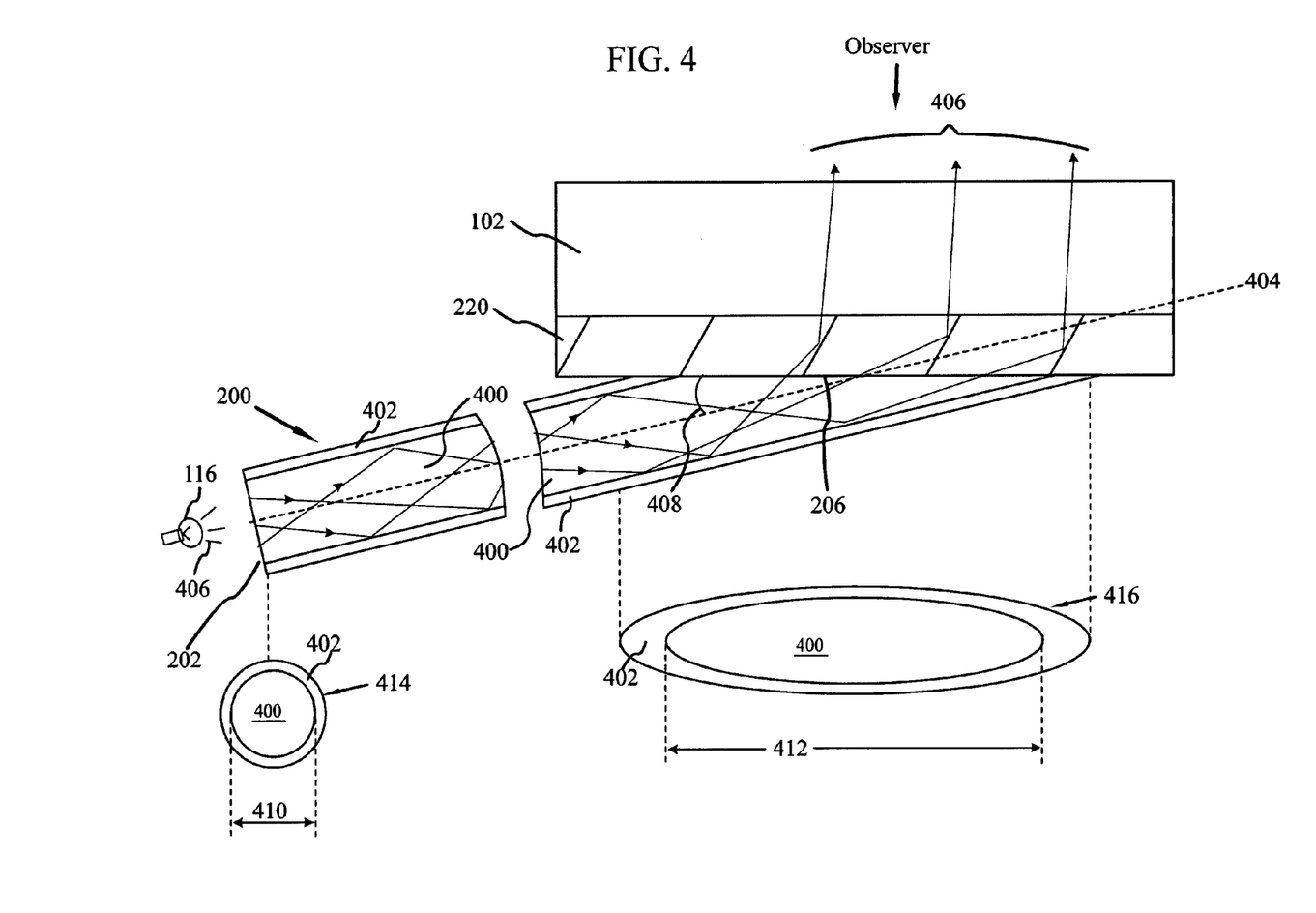
FIG. 4 is a partial cross-sectional view of a light guide with an attached louver layer and protective layer as introduced in FIG. 2.

FIG. 4 conceptually illustrates an enlarged cross-section of a single light guide 200 and a portion of louver layer 220 and protective layer 102. Although illustrated as having a circular cross section, other light guide geometries may be employed, such as, but not limited to, triangular, rectangular or hexagonal.

In at least one embodiment, the light guides 200 comprising the magnifying layers 104 of LGS 100 each have a longitudinal light guide core 400, and an external circumferential clad 402. It is, of course, realized that light guide 200 may bend, coil or otherwise contour such that it may not always lie in a straight line along longitudinal centerline 404. However, light guide 200 is shown as straight for ease of discussion and illustration.

In at least one embodiment, the core 400 is formed of a generally optically clear plastic or plastic-type material, including but not limited to a plastic such as acrylic, Plexiglas, polystyrene, polycarbonate material and combinations thereof. In an alternative embodiment, the core 400 is formed of a generally optically clear glass.

In at least one embodiment, each light guide 200 is preferably substantially totally internally reflecting such that the light, illustrated as lines 406, received at the input end 202 is substantially delivered to the magnifying output end 206 with minimal loss. Clad 402 is a material having a refraction index lower then that of the core 400. Total internal reflection, or TIR, is the reflection of all incident light off a boundary between clad 402 and core 400. TIR occurs when a light ray is both in a medium of higher index of refraction and approaches a medium of lower index of refraction, and the angle of incidence for the light ray is greater than the "critical angle."

The critical angle is defined as the smallest angle of incidence measured with respect to a line normal to the boundary between two optical media for which light is refracted at an exit angle of 90 degrees—that is, the light propagates along the boundary—when the light impinges on the boundary from the side of higher index of refraction. For any angle of incidence greater than the critical angle, the light traveling through the medium with a higher index of refraction will undergo total internal reflection. The value of the critical angle depends upon the combination of materials present on each side of the boundary.

Figure 5:
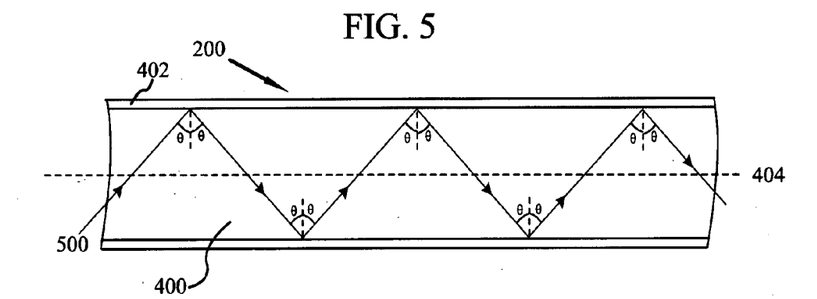
FIG. 5 is an enlarged partial cross-sectional illustrating TIR within the light guide shown in FIG. 4.

FIG. 5 is an enlarged portion of light guide 200 provided to further illustrate the possible propagation of light ray 500. Light ray 500 travels in light guide 200 through successive TIR, as shown in FIG. 5. The angle of incidence and reflection remains unchanged at angle Θ until such time as light ray 500 is delivered to the output end, not shown in FIG. 5.

As shown in FIG. 4, input end 202 is substantially perpendicular to longitudinal centerline 404. Magnifying output end 206 is angled relative to longitudinal centerline 404, at angle 408. As such, the horizontal width 410 of input end 202 is not as great as the horizontal width 412 of magnifying output end 206. In the embodiment shown, input end 202 has a substantially circular cross-section 414, while the magnifying output end 206 has a substantially elliptical cross-section 416. In at least one alternative embodiment, light guides 200 may have cross-sections relating to a square, triangle, octagon or other polygon.

Within a typical light guide 200 such as, for example, an optical fiber, the spread of light to either side of longitudinal centerline 404 is typically about 30 degrees (30°). Although the angle of output end 206 may provide a flat surface transverse to an observer, exiting light will continue substantially in the direction last suggested by longitudinal centerline 404 unless reflected or refracted at output end 206.

In at least one embodiment where such redirection is desired, such redirection of light is accomplished with a light redirection layer. In at least one embodiment the light redirection layer is a louver layer 220. A method for making a louver layer 220 is described in patent application Ser. No. 11/052612, filed Feb. 7, 2005, entitled "Method of Making A Louver Device for A Light Guide Screen" which is herein incorporated by reference. Various types of louver layers 220 are described in patent application Ser. No. 11/052605, filed Feb. 7, 2005, entitled "Holographic Louver Device for A Light Guide Screen," which is herein incorporated by reference.

Figure 6:
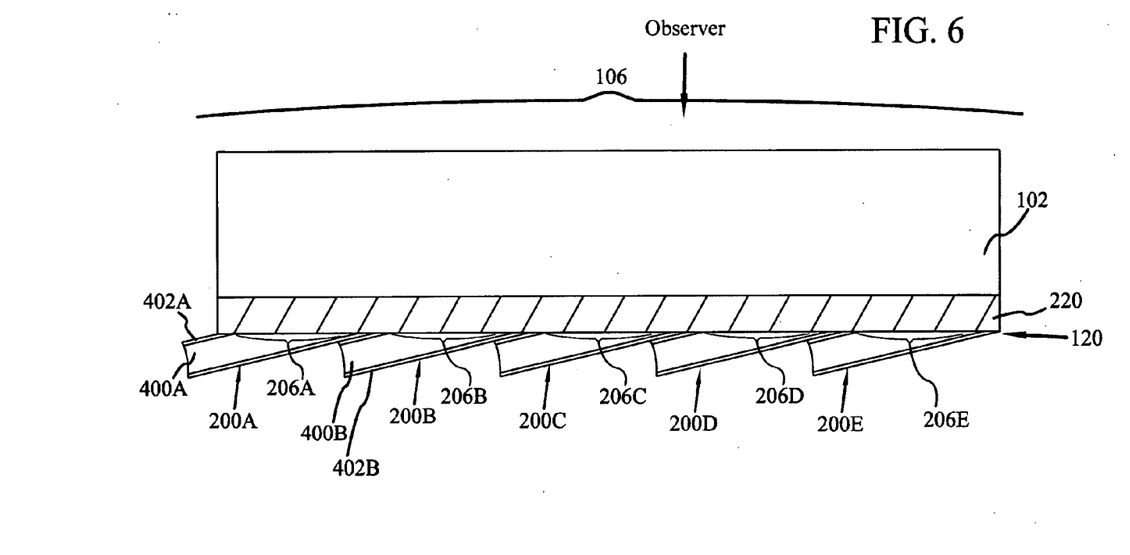
FIG. 6 is a partial cross-sectional view of several light guides joined to a common louver layer and protective layer as introduced in FIG. 2

FIG. 6 is a larger partial cross sectional view of five light guides 200A~200E, louver layer 220 and protective layer 102. In at least one embodiment, each light guide 200 may be one hundred micrometers in diameter.

In a typical display screen, visual images are represented by a plurality of individual light points, commonly referred to as pixels. Each pixel may provide the same or different light as its neighbor pixels. As a whole, it is the patterns established by the varying lights provided by the pixels that are perceived by observers as shapes, pictures and images.

Due to the small size of each pixel and/or the distance between the observer and the display, the independent nature of each pixel is not observed or perceived by the unaided eye. A typical standard TV display provides a vertical-to-horizontal resolution of 480:640 with about 307,200 pixels. A typical HDTV screen provides a vertical-to-horizontal resolution of 1080:1920 with about 2,116,800 pixels—a more than six-fold increase in pixels over a traditional TV display.

In at least one embodiment, each output end 206A~206E provides a single pixel for LGS 100. Although the relative sizes have been exaggerated for ease of discussion and illustration, it is still appreciated that the output ends 206A~206E are quite small relative to protective layer 102. Typical dimension of the output end 206A~206E is about 100 to 500 μm. A single protective layer 102, with a typical thickness of about 0.1 to 1 mm is used to cover the output ends of the whole display.

In at least one embodiment, light guides 200 are acrylic, as light guides 200 may be fabricated with desirable light propagation properties, flexibility, low cost and other desirable factors. As such, light guides 200, and specifically the output ends 206, are susceptible to solvents such as may be found in common household cleaners. Acrylic is also a soft material and may be scratched by abrasives, potentially including dust deposits. Louver layer 220, when provided, may also be fabricated from an acrylic material selected to match the index of refraction of the light guides 200.

As with acrylic light guides, an acrylic louver layer 220 is also susceptible to solvents such as may be found in common household cleaners, and abrasives, potentially including dust deposits. With respect to either the light guides 200, and/or the louver layer 220, scratches and/or solvent induced deformation of the surface is highly undesirable as such defects are likely to distort the image provided to the viewing user.

Regardless of the materials used for the fabrication of the light guides 200 and louver layer 220, protective layer 102 provides physical protection. In at least one embodiment, protective layer 102 is fabricated from polycarbonate. A polycarbonate protective layer 102 is advantageously substantially solvent resistant, scratch resistant and flexible. In at least one alternative embodiment, protective layer 102 is fabricated from glass. A glass protective layer 102 is advantageously substantially solvent resistant and highly scratch resistant.

In at least one embodiment, protective layer 102 is considerably thicker than the diameter of each light guide 200, and/or the thickness of louver layer 220. Should an abrasive material scratch or gouge the surface of protective layer 102 or a solvent distort the surface, protective layer 102 may be polished or otherwise resurfaced in the damaged area to restore an unblemished viewing surface 106.

Protective layer 102 is not removable; rather, it is intimately coupled to the output face 120 established by the output ends 206 of the light guides 200, or to the louver layer 220 which in turn is intimately coupled to the output face 120 established by the output ends 206 of the light guides 200. Protective layer 102 therefore provides additional structural support to LGS 100.

Protective layer 102 is not a diffusion layer, reflection layer, or light absorption layer. More specifically, protective layer 102 is substantially transparent so as to permit substantially all light emanating from the output ends 206 to reach an observer. As protective layer 102 is substantially transparent, and without structures or materials providing covered and uncovered areas, there is no alignment issue with respect to the output ends 206 when protective layer 102 is joined to the output ends 206, or louver layer 220, when provided.

In at least one embodiment, protective layer 102 has an index of refraction matched to the index of refraction of the light guides 200. As such, when protective layer 102 is joined to output ends 206, there is no apparent boundary to disrupt or alter the path of light as it travels from the light guides 200 through the protective layer 102. Moreover, a substantially boundaryless union exists between output ends 206 and protective layer 102. To establish this boundaryless union, a joining agent such as, for example, glue, is selected that also has a matched index of refraction. Where a louver layer 220 is provided between the output ends 206 and protective layer 102, the louver layer 220 will also have an index of refraction matched to the index of refraction of the light guides 200.

Figure 7:
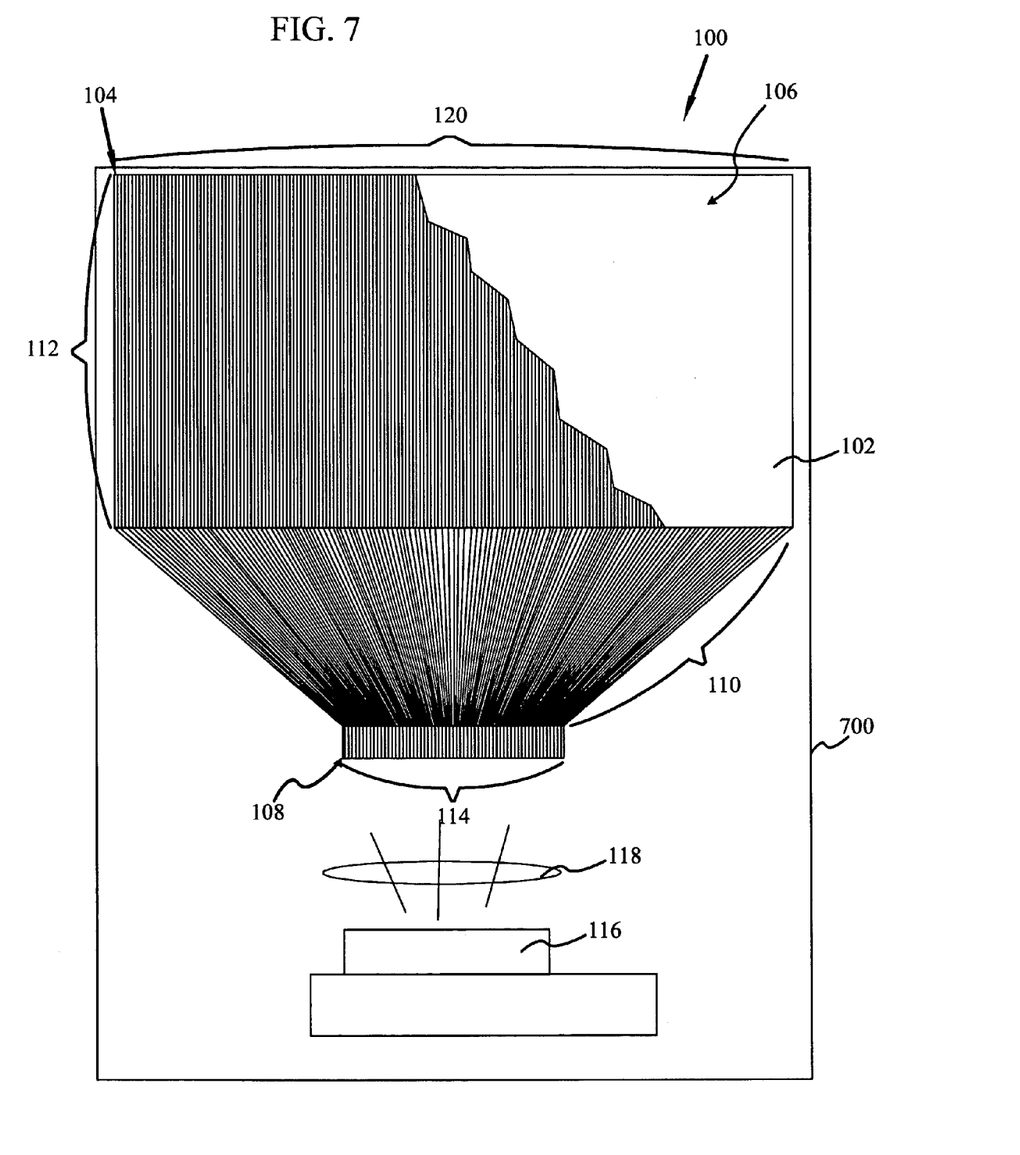
FIG. 7 shows a schematic diagram of a light guide screen with a protective layer and enclosing case according to an embodiment.

As shown in FIG. 7, by enclosing the LGS 100 with protective layer 102, at least one image source 116 and at least one lens 118 (if separate from image source 116) within a case 700, a low cost, high quality, high resolution HDTV display may be provided.

With respect to FIGS. 1 and 7, various visual image sources are known in the art, such as TI's DLP™ projection engines. The selection of a particular type of image source 116 is a matter of fabrication preference and intended purpose for the LGS 100. For a HDTV embodiment, an appropriate image source 116 should be selected to render a high definition image upon the input surface 114.

The midsections 110 permit input surface 114 to be oriented differently from viewing surface 106. In at least one embodiment, such separate alignment is advantageous in permitting a large HDTV display, such as a fifty inch display, to have a thickness of about four inches. Depending on the cross-sectional dimensions of the light guides 200 and the resolution of the screen, LGS 100 could be thinner or thicker than four inches. Reasonable thicknesses between one and six inches could be realized for television displays.

Figure 8:
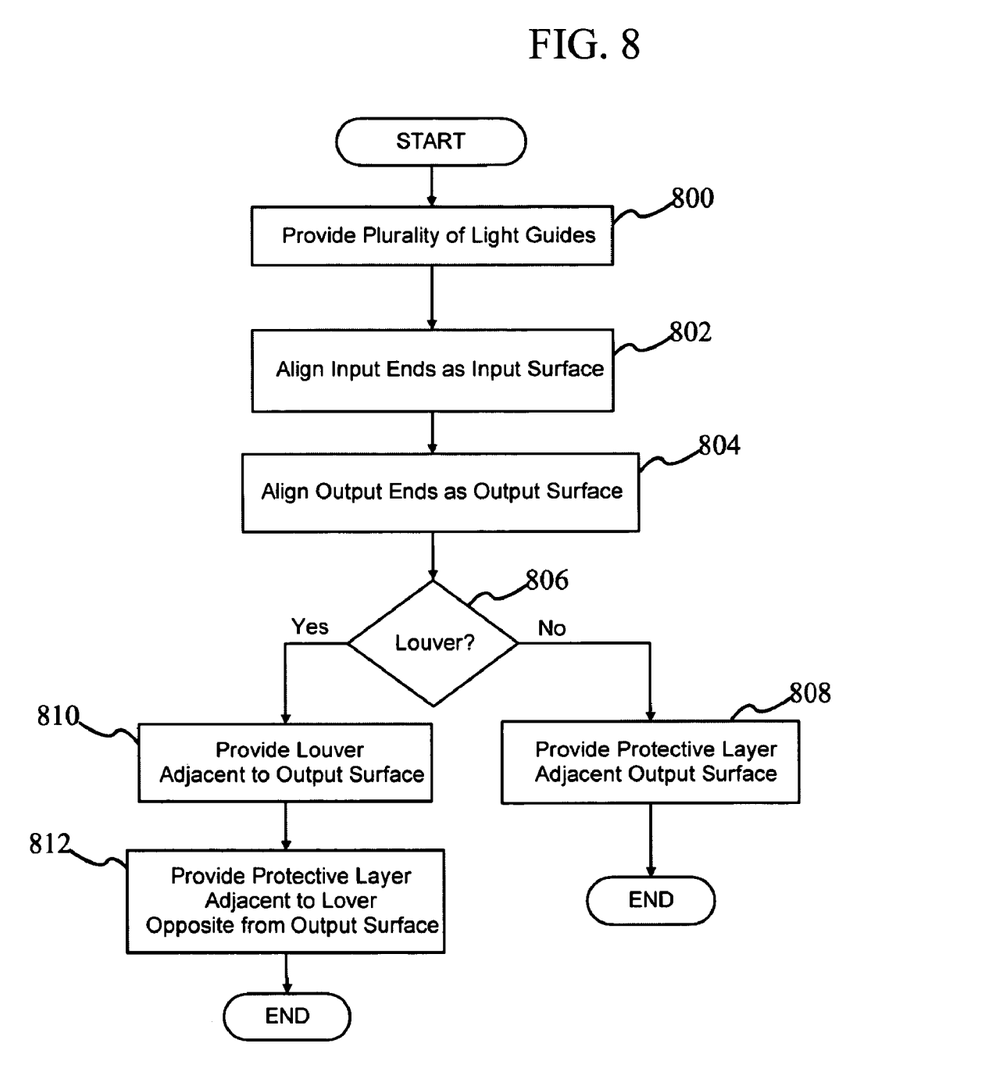
FIG. 8 is a flowchart of a method of making a light guide screen with a protective layer, in accordance with an embodiment.

Having discussed the above physical embodiments of an LGS 100 with a protective layer 102, another embodiment relating to the method of making an LGS 100 with a protective layer 102 will now be summarized with reference to the flowchart of FIG. 8. It will be appreciated that the described method need not be performed in the order in which it is herein described, but that this description is merely exemplary of at least one method of making an LGS 100 with a protective layer.

As indicated in block 800, the fabrication process commences by providing a plurality of light guides, such as light guides 200 shown in FIG. 2, each having an input end 202, a midsection 204 and an output end 206.

As shown in FIG. 2, the input ends 202 are aligned, block 802. The input ends 202 of multiple magnifying layers 104 are aligned and provide input surface 114 (see FIG. 1 and FIG. 7). The output ends 206 are also aligned as shown in FIG. 2. The output ends 206 of multiple magnifying layers 104 are aligned and provide an output face, block 804.

If a louver layer (such as louver layer 220 shown in FIGS. 2, 4, 5) is not required, decision 806, a protective layer 102, such as a polycarbonate sheet or glass sheet, is provided and joined to the output face, block 808. In at least one embodiment, a louver layer is desired, decision 806. A louver layer 220 is therefore provided adjacent to the output face, block 810. A protective layer 102, such as a polycarbonate sheet or glass sheet, is provided and joined to the louver layer 220, block 812.

Changes may be made in the above methods, systems and structures without departing from the scope thereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A light guide display with protective layer comprising:
 a plurality of aligned magnifying layers providing a viewing surface, each magnifying layer including:
  a plurality of light guides, each light guide having an input end, a midsection and a magnifying output end;
  the plurality of input ends aligned;
  the plurality of magnifying output ends aligned in substantially continuous parallel contact; and
 a protective layer coupled to the output ends.

2. The light guide display of claim 1, wherein the protective layer comprises polycarbonate.

3. The light guide display of claim 1, wherein the protective layer comprises plastic.

4. The light guide display of claim 1, wherein the protective layer comprises glass.

5. The light guide display of claim 1, wherein the protective layer is scratch resistant.

6. The light guide display of claim 1, wherein the protective layer is solvent resistant.

7. The light guide display of claim 1, wherein the light guides have a known index of refraction and wherein the protective layer has an index of refraction matched to the light guides.

8. The light guide display of claim 1, wherein the protective layer is joined to the aligned output ends with a substantially boundaryless union.

9. The light guide display of claim 1, further including a louver layer disposed between the output ends and the protective layer.

10. The light guide display of claim 9, wherein the protective layer is joined to the louver layer with a substantially boundaryless union.

11. The light guide display of claim 1, wherein the midsection is flexible.

12. A light guide display with protective layer comprising:
a plurality of aligned magnifying layers providing a viewing surface, each magnifying layer including:
a plurality of light guides, each light guide having an input end, a midsection and a magnifying output end;
the plurality of input ends aligned;
the plurality of output ends aligned in substantially contiguous parallel contact;
a louver layer coupled to the aligned magnifying ends; and
a protective layer coupled to the louver layer, opposite from the magnifying ends.

13. The light guide display of claim 12, wherein the protective layer comprises material selected from the group consisting of polycarbonate, plastic, glass and combinations thereof.

14. A method of making a light guide display with protective layer comprising:
providing a plurality of light guides, each light guide having an input end, a midsection and an output end;
arranging the plurality of light guides into a plurality of magnifying light guide layers, each one light guide thick, the output ends of the light guides in each layer aligned in substantially contiguous parallel contact, each layer providing an input end and an output end;
aligning the plurality of light guide layer input ends as an input surface;
aligning the plurality of light guide layer output ends as an output face; and
joining a protective layer to the output face.

15. The method of claim 14, further including providing a louver layer disposed between the output face and the protective layer.

16. The method of claim 14, wherein the protective layer comprises material selected from the group consisting of polycarbonate, plastic, glass and combinations thereof.

17. The method of claim 14, wherein the protective layer is scratch resistant.

18. The method of claim 14, wherein the protective layer is solvent resistant.

19. The method of claim 14, further including selecting light guides with a known index of refraction, and selecting a protective layer with an index of refraction matched to the index of refraction of the light guides.

20. A light guide display with protective layer comprising:
a case
a plurality of aligned magnifying layers disposed within the case and providing a viewing surface, each magnifying layer including:
a plurality of light guides, each light guide having an input end, a midsection and a magnifying output end;
the plurality of input ends aligned as an input surface;
the plurality of magnifying output ends aligned in substantially contiguous parallel contact;
at least one image source proximate to the input surface;
a louver layer coupled to the aligned magnifying output ends; and
a protective layer coupled to the louver layer, opposite from the magnifying output ends.

21. The light guide display of claim 20, wherein the protective layer comprises polycarbonate.

22. The light guide display of claim 20, wherein the protective layer comprises plastic.

23. The light guide display of claim 20, wherein the protective layer comprises glass.

24. The light guide display of claim 20, wherein the protective layer is scratch resistant.

25. The light guide display of claim 20, wherein the protective layer is solvent resistant.

26. The light guide display of claim 20, wherein the light guides have a known index of refraction and wherein the protective layer has an index of refraction matched to the light guides.

27. The light guide display of claim 20, wherein the protective layer is joined to the louver layer with a substantially boundaryless union.

28. The light guide display of claim 1, wherein the area of the aligned input ends is substantially less than the area of the aligned magnifying output ends.

29. The light guide display of claim 1, wherein each light guide has a longitudinal center, the input end being about perpendicular to the longitudinal center, the magnifying output end being angled relative to the longitudinal center.

30. The light guide display of claim 12, wherein the area of the aligned input ends is substantially less than the area of the aligned magnifying output ends.

31. The light guide display of claim 12, wherein each light guide has a longitudinal center, the input end being about perpendicular to the longitudinal center, the magnifying output end being angled relative to the longitudinal center.

32. The light guide display of claim 20, wherein the area of the aligned input ends is substantially less than the area of the aligned magnifying output ends.

33. The light guide display of claim 20, wherein each light guide has a longitudinal center, the input end being about perpendicular to the longitudinal center, the magnifying output end being angled relative to the longitudinal center.

* * * * *

UNITED STATES PATENT AND TRADEMARK OFFICE
CERTIFICATE OF CORRECTION

PATENT NO. : 7,256,951 B2  Page 1 of 1
APPLICATION NO. : 11/082438
DATED : August 14, 2007
INVENTOR(S) : Steven L. Naberhuis et al.

It is certified that error appears in the above-identified patent and that said Letters Patent is hereby corrected as shown below:

In column 3, line 11, delete "LDS" and insert -- LGS --, therefor.

Signed and Sealed this

Twenty-sixth Day of May, 2009

JOHN DOLL
*Acting Director of the United States Patent and Trademark Office*